United States Patent
Bradier et al.

(10) Patent No.: US 12,214,896 B2
(45) Date of Patent: Feb. 4, 2025

(54) ELECTRICAL SUPPLY SYSTEM OF AN AIRCRAFT

(71) Applicant: AIRBUS OPERATIONS (S.A.S.), Toulouse (FR)

(72) Inventors: Matthieu Bradier, Toulouse (FR); Mohamed Khaled Kahalerras, Toulouse (FR)

(73) Assignee: AIRBUS OPERATIONS (S.A.S.), Toulouse (FR)

(*) Notice: Subject to any disclaimer, the term of this patent is extended or adjusted under 35 U.S.C. 154(b) by 16 days.

(21) Appl. No.: 18/352,511

(22) Filed: Jul. 14, 2023

(65) Prior Publication Data

US 2024/0025557 A1  Jan. 25, 2024

(30) Foreign Application Priority Data

Jul. 19, 2022  (FR) ..................................... 2207394

(51) Int. Cl.
*B64D 41/00* (2006.01)
*H02J 3/46* (2006.01)

(52) U.S. Cl.
CPC ............... *B64D 41/00* (2013.01); *H02J 3/46* (2013.01); *B64D 2221/00* (2013.01)

(58) Field of Classification Search
CPC ........ B64D 41/00; B64D 2221/00; H02J 3/46
USPC .......................................................... 307/9.1
See application file for complete search history.

(56) References Cited

U.S. PATENT DOCUMENTS

| | | | |
|---|---|---|---|
| 9,387,935 B2* | 7/2016 | Todd | H02J 4/00 |
| 10,771,058 B2* | 9/2020 | Roberts | H03K 17/693 |
| 2014/0132062 A1* | 5/2014 | Brombach | B64F 1/34 |
| | | | 307/9.1 |
| 2015/0123463 A1* | 5/2015 | Huang | B60R 16/03 |
| | | | 307/9.1 |

FOREIGN PATENT DOCUMENTS

| | | |
|---|---|---|
| EP | 3130783 B1 | 5/2022 |
| FR | 3067874 A1 | 12/2018 |
| GB | 2491982 A | 12/2012 |

OTHER PUBLICATIONS

French Search Report for FR2207394 dated Feb. 17, 2023, 10 pages.

(Continued)

*Primary Examiner* — Alfonso Perez Borroto
(74) *Attorney, Agent, or Firm* — Nixon & Vanderhye P.C.

(57) ABSTRACT

An electrical supply system (10) with first and second electrical sourced (S1, S2), coupled together to electrically supply electrical loads (Z1, Z2, Z3 ... Zn) of an aircraft. The first electrical source (S1) is mechanically coupled to a primary energy source (12), to which at least one other energy consumer (16) is coupled. A controller (30) controls the first and second electrical sources (S1, S2) so that the power drawn by the first electrical source from the primary energy source (12) corresponds to a difference between an instantaneous nominal power capable of being delivered by the primary energy source and an instantaneous power drawn by the energy consumer (16), and an electrical power delivered by the second electrical source is a sum of an electrical power delivered by the first and second electrical sources which corresponds to an instantaneous electrical consumption of the electrical loads.

11 Claims, 2 Drawing Sheets

(56) References Cited

OTHER PUBLICATIONS

Figure 1:
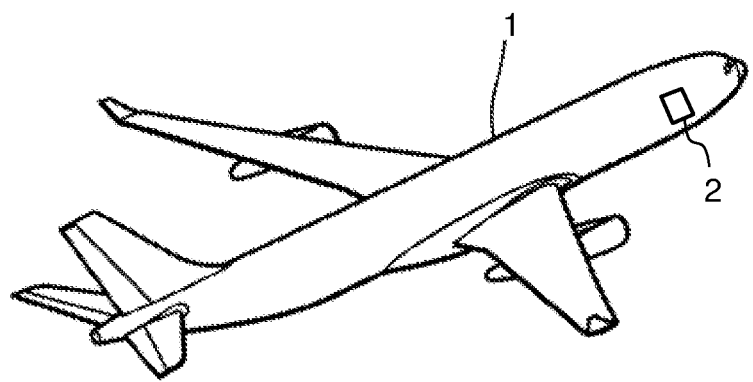

Xavier Roboam et al., "Hybrid Power Generation System for Aircraft Electrical Emergency Network" (2011) IET Electrical Systems in Transportation, vol. 1 (n°4). pp. 148-155 (2011) ISSN 2042-9738, 9 pages.

* cited by examiner

ELECTRICAL SUPPLY SYSTEM OF AN AIRCRAFT

RELATED APPLICATION

This application incorporates by reference and claims priority to French application 2207394, filed Jul. 19, 2022.

FIELD OF INVENTION

The invention relates to the field of the electrical supply of aircraft.

BACKGROUND

An aircraft generally has a group of electrical generators intended to electrically supply electrical loads of the aircraft, for example computers, actuators, etc. The electrical loads are, for example, coupled to the electrical generator by means of a central electrical layout of the aircraft. An electrical generator is, for example, mechanically driven by a propulsion engine of the aircraft to make it possible to operate the said generator. Furthermore, one or more other energy users, in particular a pump of a hydraulic circuit of the aircraft, may be mechanically coupled to the propulsion engine. Thus, such an electrical generator and such other users draw a part of the mechanical power delivered by the propulsion engine. Consequently, the mechanical coupling of the electrical generator and of the other energy users to the propulsion engine requires the provision of a sufficiently high idle speed of the engine so as not to risk stalling the engine. In phases of use of the aircraft for which a reduced thrust of the propulsion engines is desired, for example when approaching a runway or during a taxiing phase, it would sometimes be desirable to be able to reduce the idle speed of the propulsion engines, particularly in order to save fuel.

SUMMARY OF THE INVENTION

The invention may be embodied to provide a solution to this problem. It relates to an electrical supply system of an aircraft, the said system comprising at least a first electrical source and a second electrical source, which are coupled together in order to electrically supply a group of electrical loads of the aircraft, as well as a controller configured to control the first electrical source and the second electrical source, the first electrical source being mechanically coupled to a primary energy source, to which at least one energy consumer other than the first electrical source is also coupled, wherein the controller is configured to: determine an instantaneous electrical consumption consumed by the said group of electrical loads.

The system is noteworthy in that the controller is furthermore configured to: determine an instantaneous nominal power capable of being delivered by the primary energy source; determine an instantaneous power drawn by the at least one energy consumer from the primary energy source; and control the first electrical source and the second electrical source so that on the one hand the power drawn by the first electrical source from the primary energy source corresponds to a difference between the instantaneous nominal power capable of being delivered by the primary energy source and the instantaneous power drawn by the at least one energy consumer, and on the other hand an electrical power delivered by the second electrical source is such that the sum of an electrical power delivered by the first electrical source and the electrical power delivered by the second electrical source corresponds to the instantaneous electrical consumption.

Thus, the electrical supply system makes it possible to ensure that the mechanical power drawn by the first electrical source and by the at least one energy user is never greater than the instantaneous nominal power capable of being delivered by the primary energy source. When the primary energy source corresponds to a propulsion engine of the aircraft, this makes it possible to adjust an idle speed of the propulsion engine without having to take into account electrical consumptions relating to electrical loads that need to be electrically supplied only during a small part of the flight time of the aircraft, insofar as the excess electrical consumption due to these electrical loads is provided by the second electrical source. This makes it possible to reduce the idle speed of the propulsion engine in relation to the prior art.

In one embodiment, the first electrical energy source is controlled in voltage regulation mode and the second electrical energy source is controlled in current regulation mode. In particular, the controller is configured to determine a current setpoint that needs to be delivered by the second electrical source and to apply this current setpoint to the second electrical source, the current setpoint being determined by the controller so that a sum of an electrical power corresponding to this current setpoint and the electrical power delivered by the first electrical source corresponds to the instantaneous electrical consumption.

In one embodiment, the primary energy source corresponds to a propulsion engine of the aircraft or to an emergency turbine of the ram air turbine type.

In one embodiment, the at least one energy consumer comprises a hydraulic pump of a hydraulic circuit of the aircraft.

According to a first alternative, the instantaneous nominal power capable of being delivered by the primary energy source corresponds to an instantaneous maximum power capable of being delivered by the primary energy source.

According to another alternative, the instantaneous nominal power capable of being delivered by the primary energy source corresponds to an optimal operation of the primary energy source.

In one particular embodiment, the second electrical energy source comprises an electrical battery or a supercapacitor. In particular, the primary energy source corresponds to a propulsion engine of the aircraft and the controller is configured to request an increase in an idle speed of the propulsion engine when the electrical battery or the supercapacitor is not sufficiently charged to allow the second electrical source to deliver the required electrical power.

In one particular embodiment, the part of the power drawn by the first electrical source from the primary energy source corresponds to the difference between the instantaneous nominal power capable of being delivered by the primary energy source and the instantaneous power drawn by the at least one energy consumer, less a margin.

The invention also relates to an aircraft comprising such an electrical supply system.

DETAILED DESCRIPTION

The invention will be understood more clearly by reading the following description and by studying the appended figures.

FIG. 1 illustrates an aircraft equipped with an electrical supply system according to one embodiment of the invention.

Figure 2:
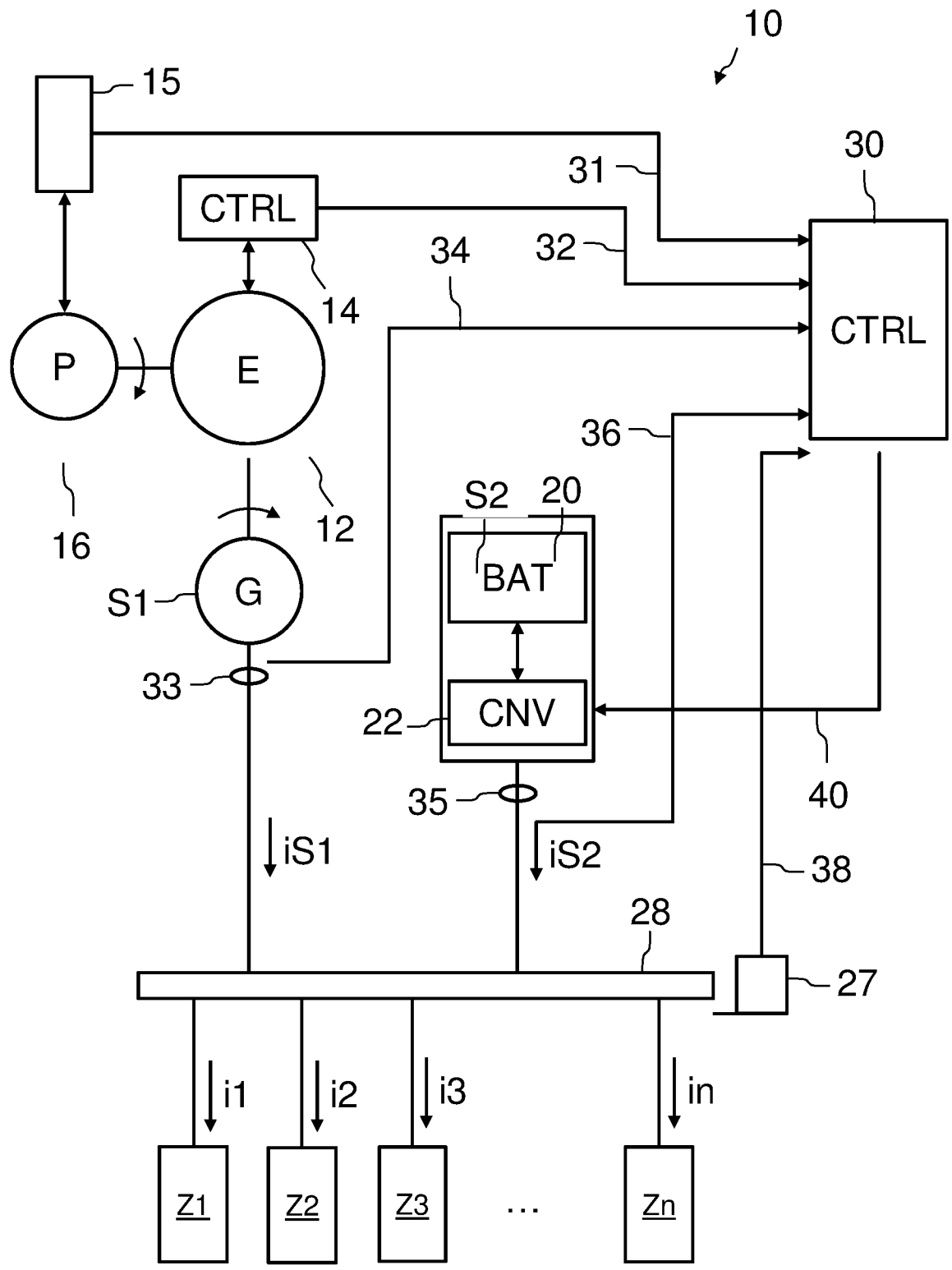

FIG. 2 schematically illustrates an electrical supply system according to one embodiment of the invention.

DETAILED DESCRIPTION

The aircraft 1 represented in FIG. 1 comprises an electrical supply system 10 such as that represented in FIG. 2. The electrical supply system comprises a set of electrical supply buses 28 supplying a group of electrical loads Z1, Z2, Z3 . . . Zn. The set of buses 28 is, for example, located in an avionics bay 2 of the aircraft. A first electrical source S1 and a second electrical source S2 are electrically coupled to the set of buses 28 so as to supply them electrically. The first electrical source corresponds to an electrical generator, labelled G in the figure, mechanically coupled to a primary energy source 12. At least one energy consumer 16 other than the first electrical source S1 is also mechanically coupled to the primary energy source 12. This energy consumer is independent of the primary energy source 12, and it corresponds for example to a hydraulic pump of a hydraulic circuit of the aircraft, which is labelled P in the figure. The primary energy source corresponds, for example, to a propulsion engine of the aircraft. In particular, the second electrical source S2 comprises an electrical energy storage device 20, for example an electrical battery or a supercapacitor. The second electrical source S2 also comprises an electrical converter 22 (CNV) connected to the electrical energy storage device 20 as well as to the set of buses 28. The electrical supply system 10 also comprises a controller 30 labelled CTRL in the figure. The controller 30 is configured to determine an instantaneous nominal power capable of being delivered by the primary energy source 12. For this purpose, it is for example connected at its input by a link 32 to a controller 14 of the primary energy source 12, for example to a controller of the FADEC ("Full Authority Digital Engine Control") or EEC ("Electronic Engine Controller") type, when the primary energy source corresponds to a propulsion engine of the aircraft. The controller 30 is also configured to determine an instantaneous power drawn by the at least one energy consumer 16. For this purpose, it is for example connected at its input by a link 31 to a controller 15 of the at least one energy consumer 16. The controller 30 is also configured to determine an instantaneous electrical consumption consumed by the group of electrical loads Z1, Z2, Z3 . . . Zn. For this purpose, according to a first embodiment, the controller 30 is connected at its input by a link 38 to an avionics computer 27 associated with a central electrical layout of the aircraft, of which the set of electrical buses 28 forms part. According to a second embodiment, the controller 30 is connected at its input on the one hand by a link 34 to a current and/or voltage sensor 33 placed on an electrical link between the first electrical source S1 and the set of electrical buses 28, and on the other hand by a link 36 to a current and/or voltage sensor 35 placed on an electrical link between the second electrical source S2 and the set of electrical buses 28. The controller 30 is also configured to control the first electrical source S1 and/or the second electrical source S2. For this purpose, it is for example connected at its output by a link 40 at least to the second electrical source S2.

During operation, the controller 30 determines an instantaneous electrical consumption consumed by the said group of electrical loads Z1, Z2, Z3 . . . Zn. In the first embodiment, the controller acquires an instantaneous electrical consumption information item from the avionics computer 27. In the second embodiment, the controller 30 acquires electrical current information items iS1 and iS2 at the output of the electrical sources S1 and S2, which come from the current sensors 33 and 35, and it calculates the instantaneous electrical consumption as a function of the said electrical current information items.

The controller 30 interrogates the controller 14 of the primary energy source 12 and, as a function of information items provided by the controller 14, it determines an instantaneous nominal power $P_{12}$ capable of being delivered by the primary energy source 12. The controller 30 also interrogates the controller 15 of the at least one energy consumer 16 and, as a function of information items provided by the controller 15, it determines an instantaneous power $P_{16}$ drawn by the at least one energy consumer 16 from the primary energy source 12.

The controller 30 controls the first electrical source S1 and the second electrical source S2 so that the power drawn by the first electrical source S1 from the primary energy source 12 corresponds to a difference between the instantaneous nominal power capable of being delivered by the primary energy source 12 and the instantaneous power drawn by the at least one energy consumer 16. This makes it possible to ensure that the sum of the powers drawn from the primary energy source 12, respectively by the first electrical source S1 and by the at least one energy consumer 16, does not exceed the instantaneous nominal power capable of being delivered by the primary energy source 12. Furthermore, the controller 30 controls the second electrical source S2 so that the sum of an electrical power delivered by the second electrical source S2 and an electrical power delivered by the first electrical source S1 corresponds to the instantaneous electrical consumption of the electrical loads Z1, Z2, Z3 . . . Zn. This makes it possible to ensure that the electrical sources S1 and S2 provide a sufficient power to supply these electrical loads.

The instantaneous electrical power $P_{12}$ capable of being delivered by the primary energy source 12 may vary during the use of the aircraft, in particular as a function of flight phases of the aircraft. The control of the first electrical source S1 and the second electrical source S2 by the controller 30 is dynamic, to adapt to the variations of the instantaneous electrical power $P_{12}$ capable of being delivered by the primary energy source and to the variations of the instantaneous electrical consumption of the electrical loads. For example, when the primary energy source 12 corresponds to a propulsion engine of the aircraft, the instantaneous electrical power $P_{12}$ capable of being delivered by the propulsion engine varies as a function of an idle speed of the engine, this idle speed being in particular being different according to various phases of use of the aircraft (on the ground, during flight in a climb phase, during flight in a cruise phase, during flight in a runway approach phase, etc.).

Advantageously, the part of the power drawn by the first electrical source S1 from the primary energy source 12 corresponds to the difference between the instantaneous nominal power capable of being delivered by the primary energy source 12 and the instantaneous power drawn by the at least one energy consumer 16, less a margin. This margin allows better robustness of the electrical supply system in respect of variations of the instantaneous nominal power capable of being delivered by the primary energy source 12, variations of the instantaneous power drawn by the at least one energy consumer 16, and variations of the instantaneous electrical consumption of the electrical loads.

In one embodiment, the first electrical energy source S1 is controlled in voltage regulation mode and the second electrical energy source S2 is controlled in current regulation mode. Advantageously, the controller 30 is then configured to determine a current setpoint that needs to be delivered by the second electrical source S2 and to apply this current setpoint to the second electrical source S2 via the link 40. Since the first electrical source S1 is controlled in voltage regulation mode, it defines the voltage applied to the set of buses 28 independently of the current iS1 delivered by the first electrical source S1. Since the second electrical source S2 is controlled in current regulation mode, its current setpoint defines the current iS2 delivered by the second electrical source S2. The first electrical source S1 automatically adapts the current iS1 that it delivers so that the sum of the currents iS1 and iS2 corresponds to the instantaneous electrical consumption of the electrical loads. The current setpoint that needs to be delivered by the second electrical source S2 is determined by the controller 30 so that the electrical power delivered by the second electrical source is sufficient to allow the power drawn by the first electrical source S1 from the primary energy source 12 to correspond to a difference between the instantaneous nominal power capable of being delivered by the primary energy source 12 and the instantaneous power drawn by the at least one energy consumer 16.

In one nonlimiting exemplary embodiment of the invention, the controller 30 acquires via the link 34 an instantaneous value of the current iS1 delivered by the first electrical source S1, and it calculates an instantaneous power $P_{S1}$ delivered by the first electrical source S1. This power is such that:

$$P_{S1} = iS1 \times V$$

where V is the voltage applied to the set of buses 28, which is defined by the first electrical source S1.

The power $PP_{S1}$ drawn by the first electrical source S1 from the primary energy source 12 is such that:

$$P_{S1} = \eta \times PP_{S1}$$

where η is the efficiency of the first electrical source S1. In the particular case in which the primary energy source 12 is a propulsion engine of the aircraft and in which the first electrical source S1 is an electrical generator, η is the efficiency of the conversion of mechanical power into electrical power by this electrical generator.

Given the aforementioned operation of the controller 30, the power $PP_{S1}$ drawn by the first electrical source S1 from the primary energy source 12 satisfies the following relationship:

$$PP_{S1} = P_{12} - P_{16}$$

and consequently the power $P_{S1}$ delivered by the first electrical source S1 satisfies the following relationship:

$$P_{S1} = \eta \times (P_{12} - P_{16})$$

An instantaneous power $P_{S2}$ delivered by the second electrical source S2 is such that:

$$P_{S2} = iS2 \times V$$

Since the first electrical source S1 and the second electrical source S2 are coupled to the set of electrical buses 28, the total electrical power $P_Z$ delivered to the electrical loads Z1, Z2, Z3 . . . Zn is equal to:

$$P_Z = P_{S1} + P_{S2}$$

This total electrical power corresponds to the instantaneous electrical consumption of the electrical loads. The instantaneous electrical consumption of the electrical loads may be expressed equally well in the form of the total electrical power $P_Z$ and in the form of a total electrical current $I_Z$ corresponding to the sum of the individual electrical currents i1, i2, i3 . . . in of the various electrical loads Z1, Z2, Z3 . . . Zn. The total electrical current $I_Z$ is such that:

$$I_Z = iS1 + iS2$$

Given that $P_{S1} = \eta \times (P_{12} - P_{16}) = iS1 \times V$, iS1 must be equal to:

$$iS1 = \eta \times (P_{12} - P_{16})/V$$

Consequently, given that $I_Z = iS1 + iS2$, iS2 must be equal to:

$$iS2 = I_Z - \eta \times (P_{12} - P_{16})/V$$

The current setpoint $IC_{S2}$ determined by the controller 30 for the second electrical source S2 is therefore equal to:

$$IC_{S2} = I_Z - \eta \times (P_{12} - P_{16})/V$$

Advantageously, the instantaneous nominal power $P_{12}$ capable of being delivered by the primary energy source 12 corresponds to an instantaneous maximum power capable of being delivered by the primary energy source. This instantaneous maximum power is, for example, determined by the controller 14 associated with the primary energy source. According to one embodiment, when the primary energy source corresponds to a propulsion engine of the aircraft, the instantaneous maximum power is determined by the controller 14 while taking into account an instantaneous speed of the propulsion engine. This instantaneous speed is greater than or equal to an idle speed of the propulsion engine, according to the flight phases of the aircraft. According to another embodiment, the instantaneous maximum power determined by the controller 14 corresponds to an idle speed of the propulsion engine.

In one particular embodiment, the primary energy source 12 corresponds to an emergency turbine of the RAT ("Ram Air Turbine") type. In one embodiment, the instantaneous nominal power $P_{12}$ capable of being delivered by the primary energy source 12 corresponds to an instantaneous maximum power capable of being delivered by the emergency turbine of the RAT type. In another embodiment, the instantaneous nominal power $P_{12}$ capable of being delivered by the primary energy source 12 corresponds to an optimal operation the emergency turbine of the RAT type. The article Roboam, "Hybrid Power Generation System For Aircraft Electrical Emergency Network" (2011) IET Electrical Systems in Transportation, vol. 1 (n°4). pp. 148-155 (2011) ISSN 2042-9738, describes a method, known as MPPT ("Maximum Power Point Tracking"), for finding an optimal operating point of such an emergency turbine of the RAT type.

In one advantageous embodiment, when the second electrical source S2 comprises a rechargeable element 20 such as an electrical battery or a supercapacitor, when the instantaneous nominal power $P_{12}$ capable of being delivered by the primary energy source 12 is sufficiently high so that the current setpoint ($IC_{S2}$)

$$IC_{S2} = I_Z - \eta \times (P_{12} - P_{16})/V$$

is determined by the controller 30 is negative, the converter 22 initiates recharging of the rechargeable element 20.

In one particular embodiment, when the primary energy source 12 corresponds to a propulsion engine of the aircraft and when the rechargeable element 20 is not sufficiently charged to provide the power $P_{S2}$ corresponding to the current setpoint $IC_{S2}$, the controller 30 sends a request to the controller 14 in order to request an increase of an idle speed of the propulsion engine. Such an increase in the idle speed then makes it possible to increase the mechanical power capable of being drawn by the first electrical source S1 from the propulsion engine, to allow the first electrical source S2 to provide a sufficient electrical power for electrically supplying the electrical loads.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both, unless the this application states otherwise. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An electrical supply system for an aircraft comprising:
   a first electrical source, wherein the first electrical source is mechanically coupled to a primary energy source which is coupled to at least one energy consumer other than the first electrical source,
   a second electrical source coupled to the first electrical source and configured to electrically supply electrical power a group of electrical loads in the aircraft, and
   a controller configured to:
      determine an instantaneous electrical consumption consumed by the group of electrical loads;
      determine an instantaneous nominal power capable of being delivered by the primary energy source;
      determine an instantaneous power drawn by the at least one energy consumer from the primary energy source; and
      control the first electrical source and the second electrical source so that:
         the power drawn by the first electrical source from the primary energy source corresponds to a difference between the instantaneous nominal power capable of being delivered by the primary energy source and the instantaneous power drawn by the at least one energy consumer, so as to ensure that the mechanical power drawn by the first electrical source and by the at least one energy user is never greater than the instantaneous nominal power capable of being delivered by the primary energy source, and
         an electrical power delivered by the second electrical source is such that a sum of an electrical power delivered by the first electrical source and the electrical power delivered by the second electrical source corresponds to the instantaneous electrical consumption.

2. The electrical supply system according to claim 1, wherein the first electrical energy source is controlled in a voltage regulation mode and the second electrical energy source is controlled in a current regulation mode.

3. The electrical supply system according to claim 2, wherein the controller is further configured to:
   determine a current setpoint to be delivered by the second electrical source, and
   apply the current setpoint to the second electrical source, wherein the controller determines the current setpoint is determined based on a sum of an electrical power corresponding to the current setpoint and the electrical power delivered by the first electrical source corresponding to the instantaneous electrical consumption.

4. The electrical supply system according to claim 1, wherein the primary energy source corresponds to a propulsion engine of the aircraft or to an emergency turbine of a ram air turbine type.

5. The electrical supply system according to claim 1, wherein the at least one energy consumer comprises a hydraulic pump of a hydraulic circuit of the aircraft.

6. The electrical supply system according to claim 1, wherein the instantaneous nominal power capable of being delivered by the primary energy source corresponds to an instantaneous maximum power capable of being delivered by the primary energy source.

7. The electrical supply system according to claim 1, wherein the instantaneous nominal power capable of being delivered by the primary energy source corresponds to an optimal operation of the primary energy source.

8. The electrical supply system according to claim 1, wherein the second electrical energy source comprises an electrical battery or a supercapacitor.

9. The electrical supply system according to claim 8, wherein the primary energy source corresponds to a propulsion engine of the aircraft, and
   the controller is further configured to request an increase in an idle speed of the propulsion engine when the electrical battery or the supercapacitor is not sufficiently charged to allow the second electrical source to deliver the required electrical power.

10. The electrical supply system according to claim 1, wherein part of the power drawn by the first electrical source from the primary energy source corresponds to the difference between the instantaneous nominal power capable of being delivered by the primary energy source and the instantaneous power drawn by the at least one energy consumer, less a margin.

11. An aircraft comprising the electrical supply system according to claim 1.

* * * * *